(12) United States Patent
Kewitsch

(10) Patent No.: US 9,188,748 B2
(45) Date of Patent: *Nov. 17, 2015

(54) RADIO FREQUENCY IDENTIFICATION OVERLAY NETWORK FOR FIBER OPTIC COMMUNICATION SYSTEMS

(71) Applicant: Anthony Stephen Kewitsch, Marina del Rey, CA (US)

(72) Inventor: Anthony Stephen Kewitsch, Marina del Rey, CA (US)

(73) Assignee: Telescent Inc., Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,169

(22) Filed: Oct. 7, 2013

(65) Prior Publication Data

US 2015/0222352 A1    Aug. 6, 2015

Related U.S. Application Data

(62) Division of application No. 12/626,680, filed on Nov. 26, 2009, now Pat. No. 8,554,033.

(60) Provisional application No. 61/119,503, filed on Dec. 3, 2008.

(51) Int. Cl.
| | |
|---|---|
| *G02B 6/44* | (2006.01) |
| *H04B 10/00* | (2013.01) |
| *G08C 19/16* | (2006.01) |
| *G08B 13/14* | (2006.01) |
| *G02B 6/38* | (2006.01) |

(52) U.S. Cl.
CPC ............ *G02B 6/3817* (2013.01); *G02B 6/3895* (2013.01)

(58) Field of Classification Search
CPC .............. G02B 6/3895; G02B 6/3817; G06K 19/0672; H01R 9/2475; H04Q 2209/47

USPC ........ 385/101; 398/113, 115–117; 340/12.51, 340/13.26, 310.11, 500, 505, 568.1, 572.1, 340/572.5, 572.7, 68, 6, 2, 854.7
See application file for complete search history.

(56) References Cited

U.S. PATENT DOCUMENTS

| | | | | |
|---|---|---|---|---|
| 2005/0237159 | A1* | 10/2005 | Cooper et al. | 340/10.5 |
| 2008/0159738 | A1* | 7/2008 | Lavranchuk | 398/17 |
| 2010/0079248 | A1* | 4/2010 | Greveling | 340/10.1 |
| 2010/0098425 | A1* | 4/2010 | Kewitsch | 398/116 |
| 2010/0178058 | A1* | 7/2010 | Kozischek et al. | 398/115 |

FOREIGN PATENT DOCUMENTS

WO    WO 2006/126320 A1 * 11/2006 ................ H01P 5/02

* cited by examiner

*Primary Examiner* — Robert Tavlykaev
(74) *Attorney, Agent, or Firm* — Raymond Bogucki

(57) ABSTRACT

In this invention, a radio frequency identification overlay network that automates the discovery and configuration management of all physical fiber optic connections within a distributed communications network is disclosed. Miniaturized, low crosstalk RFID tags at a first fiber optic receptacle location and miniature, distributed, multiplexed reader antenna at a distant, second fiber optic receptacle location are joined by a fiber optic link which transmits both optical data and RF electronic signals. This electronic-fiber optic interface is comprised of two separated, miniaturized resonant antenna in communication with another through a resonant RF transmission line integral to the fiber optic cable. This RFID overlay network is comprised of multiplexed RFID readers, RF resonant fiber optic cables, and miniaturized RFID tags attached to the connector receptacles of network elements. The RFID overlay network interrogates tags automatically and remotely through the RF transmissive and optically transmissive fiber optic patch cords.

5 Claims, 11 Drawing Sheets

RADIO FREQUENCY IDENTIFICATION OVERLAY NETWORK FOR FIBER OPTIC COMMUNICATION SYSTEMS

FIELD OF THE INVENTION

This invention relates to apparatus and systems to automate the management of optical fiber communication systems, and more particularly, to a distributed network of miniaturized radio frequency identification tags and electrically transmissive fiber optic cables that automatically determine the arrangement of physical interconnects across a network of fiber optic links.

BACKGROUND OF THE INVENTION

Layer-0, the fiber optic physical network layer, is the foundation of the global communications infrastructure for transmitting voice, data and video traffic. The management of this portion of the network is a labor-intensive process involving manual record keeping, testing, debugging and cable patching. According to BICSI News, up to 70% of network downtime is the result of cabling problems. Network Systems DesignLine [Mar. 14, 2007] reported that "the number one cause of fiber optic network downtime is equipment damage resulting from human error, either through rough handling or improper cable routing".

The challenges to operate large-scale networks are currently being addressed in part by automating the higher network layers, in particular, layer-1 through layer-7. Since these particular layers are comprised of electronic and software network elements, they are readily monitored by network management systems. In contrast, optical interconnect elements within layer-0, being purely optical and electrically passive, comprise an invisible infrastructure whose status is often neglected and management is highly manual. This situation is exacerbated by the fact that layer-0, the "physical layer", is the largest in terms of the number of network elements, including all the fiber optic patch-panels, distribution frames and cables that link routers, switches and multiplexers.

Technologies to automate the management and monitoring of the communications infrastructure are of prime importance. For instance, Radio Frequency Identification (RFID) technology has the potential to reduce the challenges of managing a large inventory of physical network elements. In the "RFID Handbook" (1$^{st}$ Edition, 1999) by B. Finkenzeller, an overview of the various electronic identification techniques are described.

Regarding specific RFID applications to communications, U.S. Pat. No. 6,808,116 to Eslambolchi et al. describes fiber optic patch-cords wherein an RFID tag is integrated with a fiber connector. Kozischek et al. in US 2009/0097846 describes the use of one or more mobile RFID readers to read and write to tags in the general vicinity of the reader. Cook describes in US 2008/0204235 the use of fiber optic cables in which a multiplicity of RFID tags are disposed along the length of each fiber optic cable.

In these prior art RFID systems, a single reader interrogates an extended volume occupied by potentially a large number of closely spaced tags. To aid in the identification of a specific cable, Downie et al. in US 2008/0100467 describes the integration of an RFID tag and physical switch on a fiber optic connector. The depression of the switch activates the particular tag associated with that connector, so that only its unique RF identifier is read by a global RFID reader. This is a manual approach to resolve the crosstalk that arises upon interrogating a panel with a multiplicity of closely spaced RFID tags.

Furthermore, techniques to extend the range of a portable RFID reader has been described by R. Stewart in US 2009/0015383, entitled "Inductively Coupled Extension Antenna for a Radio Frequency Identification Reader". Stewart describes a portable RFID reader with a rigid, attachable extension tube antenna that is inductively coupled to the portable RFID reader.

In an alternative RFID approach, the translation and transmission of RFID signals into the optical domain is described by Easton in US 2007/285239. The electronic RFID signal is converted to optical domain by an E-O converter and transported over fiber to a distant reader.

While these various prior art RFID systems and devices can assist in the inventory management of physical connections, they nonetheless require significant manual intervention to determine and relate the network topology map to the physical interconnection database. Significant network operations advantages are derived by providing automated approaches to these highly manual processes.

SUMMARY OF THE INVENTION

In this invention, a radio frequency identification overlay system is disclosed to automate the discovery and configuration management of physical fiber optic connections within a distributed communications network. Miniaturized, high spatial selectivity RFID tags at a first fiber optic receptacle location (e.g, an active network element such as an amplifier or packet switch) and miniature, distributed, multiplexed reader antenna at a distant, second fiber optic receptacle location (e.g., at the patch-panel or automated cross-connect) are interfaced by a fiber optic interface bearing an integral, radio frequency transmission line which is resonant at one or more particular frequency ranges. The transmission line associated with this fiber optic interface is comprised of two widely separated, miniaturized resonant LC circuits at the opposite fiber optic connectors of the interface, in communication with one another through a conductor pair integral with a fiber optic cable. Tags and antenna provide high spatial discrimination so that the connectivity of densely arranged interconnects can be unambiguously determined are further disclosed. Each unique RF code is transmitted back to an RFID reader at the patch-panel without a direct physical electrical connection between the tag and reader, or manual tag interrogation.

In accordance with the system aspects of this invention, the RFID overlay system is comprised of one or more multiplexed RFID readers at one or more manual or automated fiber optic patchpanels and/or cross-connects, RF resonant fiber optic cables, and miniaturized RFID tags attached to the connector receptacles of network elements. The RFID overlay network interrogates tags automatically and remotely through the transmission lines integral to fiber optic patchcords, thereby eliminating the need for manual readout by technicians.

DETAILED DESCRIPTION OF THE INVENTION

Figure 1:
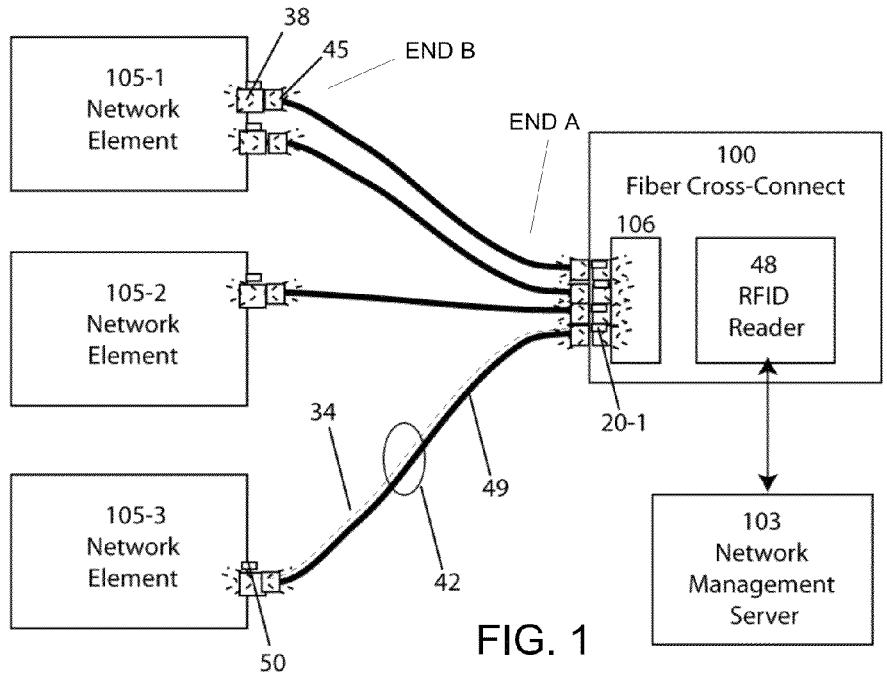
FIG. 1 schematically illustrates an RFID overlay system enabling automated determination of network connectivity, in addition to inventory.

In this invention, a fully automated fiber optic physical layer mapping and inventory management system is disclosed (FIG. 1), comprised of an RFID overlay network wherein RFID tags 50, reduced in volume to less than 75 mm$^3$ and responsive to 125 kHz RF excitation, are attached adjacent to fiber optic connector receptacles 38, such as those compatible with standard LC, SC, MT connectors 37, distributed to a multiplicity of network elements 105, such as electronic add/drop multiplexers or electronic cross-connects. The overlay aspect relates to the substantially parallel and identical paths followed by the electronic RF transmission lines 34 and the optical transmission lines 49. The overly system also utilizes resonant close coupling between inductor components 20, requiring that the adjacent reader antenna 20-1 to cable inductor 20-2, and cable inductor 20-3 to tag antenna 20-4 lie within 1 to 10 mm of one another. This ensures that only one tag is read out through any one cable 42.

Distributed RFID tags 50 on distributed network elements 105 are therefore read out remotely through a corresponding number of different fiber optic patch cords 42 comprised of an optical transmission line or cable 49 and an RF electrical transmission line 34. The network of RF transmission lines 34 closely parallel the underlying network of optical cables 49. RF transmission lines 34 carry the RFID data signal 85 to one or more centralized RFID readers 48 through a multiplexer 106 integral to a fiber optic patch-panels and cross-connects 100. Read-out of RFID tags 50 through the RF transmissive fiber optic cables 42 establishes the proximal to distal cable 42 connectivity relationships for all physical links of the network in an automated, software driven process. This process thereby reveals or discovers the physical fiber optic network configuration.

The RFID readers 48 are in further communication with one or more network management servers 103, on which application software resides, to automate the process of discovery and mapping. The RFID electronic overlay network represents passive optical interconnections or connector receptacles 38 on distributed network elements 105 by a unique electronic identifier stored in non-volatile memory within each tag 50. Once the RFID hardware is in place to measure these RFID tags 50, the electronic identifiers are readily tracked by software on the network management server 103. Miniaturized tags 50 enable the management of optical network elements 105 automatically by the network management software system. The RFID system provides near-real time configuration information, the refresh rate dictated by the data rate of the tags 50 (typically 2 kHz at a carrier frequency of 100 to 150 kHz) and payload size, typically 64 bits), to provide high level scripting and process automation capabilities. Processes such as automated provisioning, discovery and testing can thereby be realized by the network management server 103.

Figure 2:
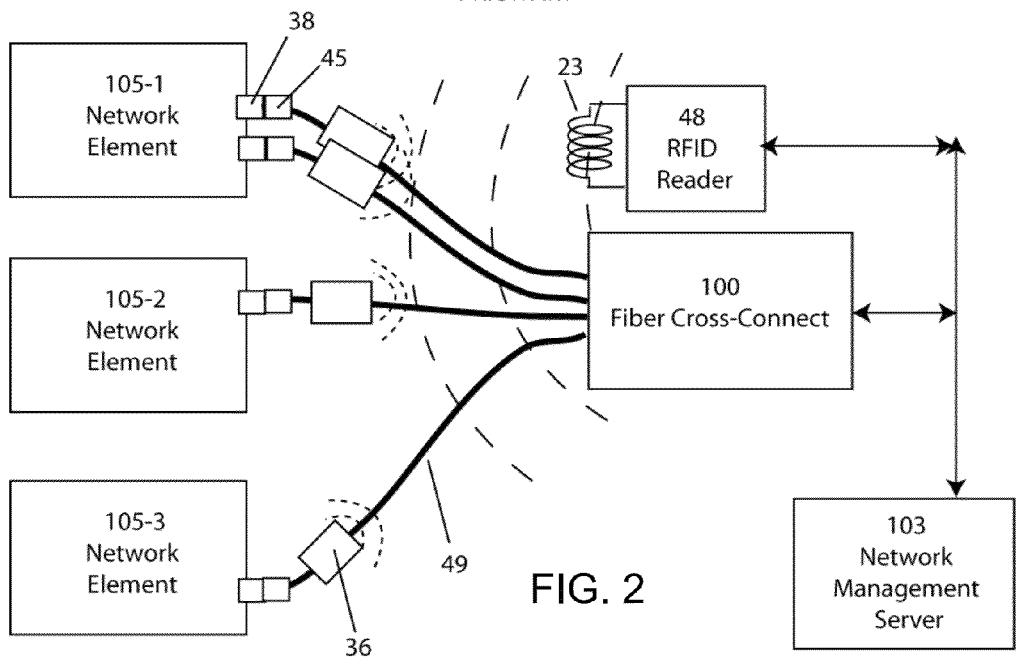
FIG. 2 illustrates a prior art RFID inventory system in block diagram form.
Figure 3:
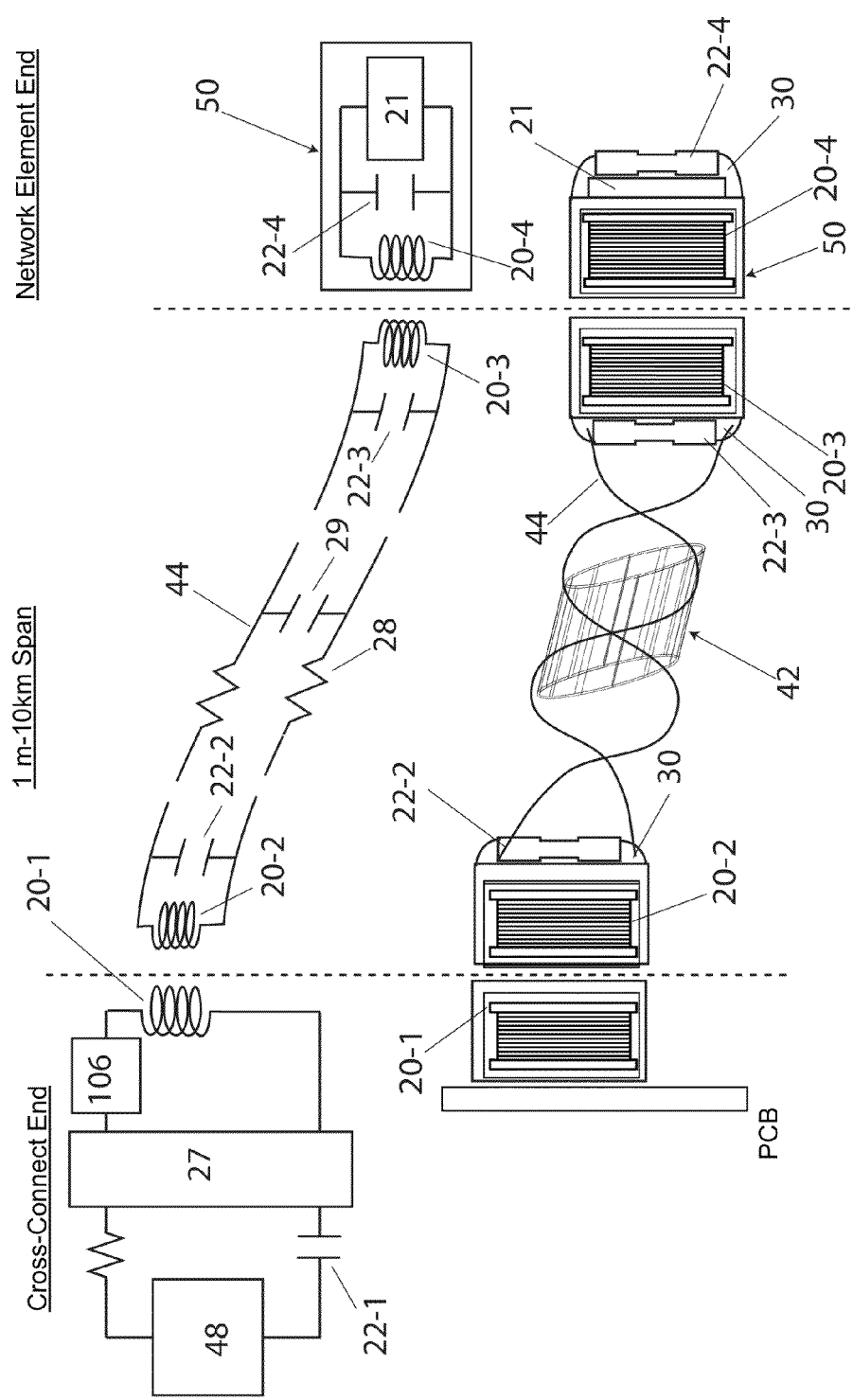
FIG. 3 illustrates an example equivalent circuit and its corresponding physical representation for a particular RFID link.

Prior art RFID systems, such at that illustrated schematically in FIG. 2, are able to identify the presence of a multiplicity of network assets 103 by reading RFID tags 36 integrated with cables, but they do not reveal end-to-end connectivity of links 49. As depicted in this figure, a large number of distributed RFID readers 48 interrogate those RFID tags integral to fiber optic connectors 36 within a limited reading range, typically <10 meters for high frequency RFID systems. While this approach is effective at identifying physical assets such as fiber optic cables 49 having tagged connectors 37 near the reader, it does not establish the input-output relationships between network elements 105 and patch-panels or cross-connects 100. That is, this type of system is not able to ascertain how network elements 105 are interconnected to other network assets 105. Therefore, this prior art system is ineffective at producing a map of the physical network topology, which is of particular value for efficient network management and a reduction in human errors related to manual record keeping.

Moreover, typical prior art RFID tracking systems used in warehouse inventory applications utilize large tags 36 and large reader antenna 23 that are designed to maximize the reader-to-tag working distance or range. As a result, large (>25 mm diameter) helical antenna are used on both the reader and tag circuits. Range is further extended in the prior art by operating at higher RF frequencies, i.e., greater than 10 MHz.

In contrast to these prior art implementations, the invention disclosed herein achieves precise spatial discrimination when reading tags 50 through composite fiber optic cables 42 to resolve connections between adjacent, closely spaced fiber optic port receptacles 38 without crosstalk. These advantages are realized in part by reducing the tag 50 dimensions to less than 5 mm while maintaining an adequate mutually-inductive coupling efficiency. Since the reading range is proportional to the size of the antenna, custom, miniaturized antennas sized for standard LC and SC fiber optic connectors are necessary to achieve high spatial discrimination.

In a particular example, FIGS. 3-8 illustrate various views and elements of the RFID electronic overlay system disclosed herein. Typically, the RFID reader 48 is integrated within a patch-panel or cross-connect 100. A multiplicity of miniature reader coils 20-1, electrically connected to the multiple lines of an electronic multiplexer interface 106, share a single electronic RFID reader 48. The coils 20-1 are attached adjacent the connector receptacles 38 of the patch-panel or cross-connect 100. Reader coils 20-1 are in close proximity to the coils 20-2 integral with the connectors 45 of the RF transmissive fiber optic cables 42 that are inserted into the connector receptacles 38. The reader 48 produces an reader excitation signal 83 that is coupled to and launched down the selected RF transmission line of the composite fiber optic cable 42 to the cable coil 20-3 at the far end of the cable, which is connected to another connector receptacle 38 associated with network element 105. Second cable coil 20-3 is inductively coupled to the RFID transceiver coil 20-4 that lies in close proximity to the connector receptacle 38 of mating adapter 40. The inductive coupling is of sufficient strength to produce a tag excitation voltage 84 across the coil of the RFID transceiver 50, even though the reader 48 may several km away from the tag 50.

Figure 12:
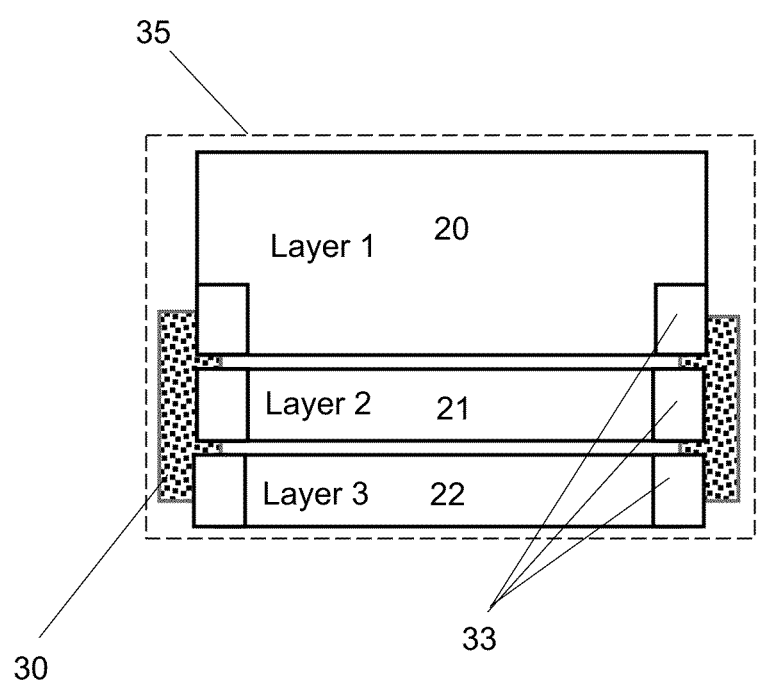
FIG. 12 is a schematic of a multi-layered RFID tag.

In a particular embodiment, low frequency RFID tags 50 fitting within a reduced volume 35 of about 64 mm$^3$ (approximately a 4 mm cube) or smaller are attached to the ports of routers, switches and test equipment (and any other device within the class of communication apparatus referred to as network elements) within a central office or data center, for example. The volume of the RFID tag assembly is miniaturized by utilizing a three-dimensional stack of substantially, flat two-terminal circuit elements electrically attached in parallel (FIG. 12). The stack consists of a surface mount ferrite inductor 20, a flat-packaged RFID transceiver 21, and a surface mount external resonant capacitor 22. In a specific example, the resonance capacitor 22 has a value of 1.35 to 1.6 nF, the inductor has a value of 1.0 mH, the RFID transceiver has an internal capacitance of 0.25 nF, and the transceiver is responsive to a 125 kHz excitation voltage 84 with an amplitude greater than 2 volts.

Figure 4:
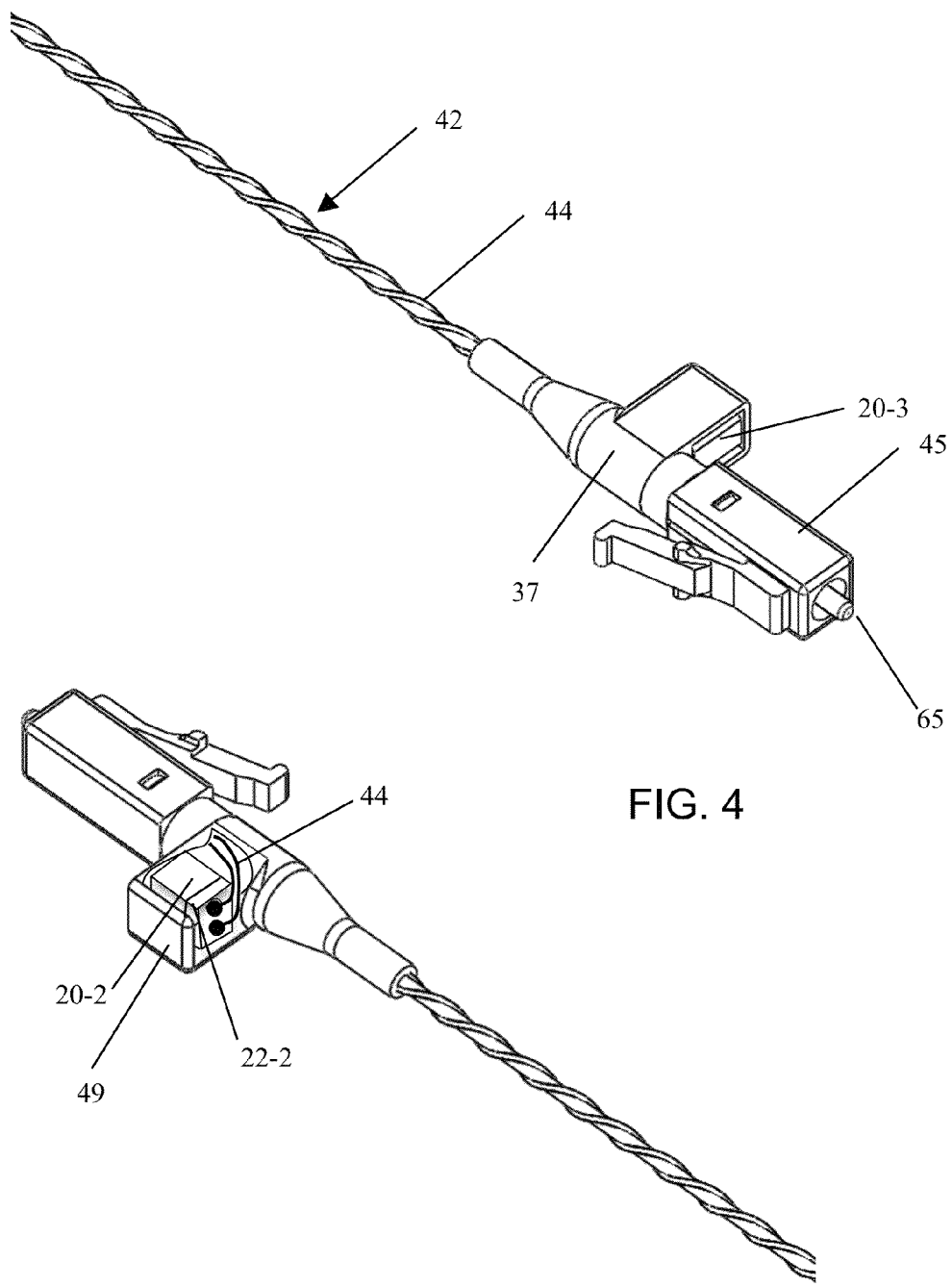
FIG. 4 illustrates a standard LC type simplex fiber optic connectors in which resonant LC elements have been added.

RFID tags 50 are read out by inductive or magnetic coupling to miniature, resonantly configured antenna coils 20-2, 20-3 integrated within the LC, SC, or MT connectors 45 of composite fiber optic cables. FIG. 4 illustrates an example of such coils integral with a simplex LC connectorized fiber optic cable. The conductors 44 are integral to fiber optic cables 42 to transmit low frequency digital identifiers over the typically <1 km inter-facility patch-cords 42.

Read-out of a particular tag is activated by a microcontroller that configures the multiplexer 106 to select a particular port at the patch-panel. The reader produces an excitation signal 83 on its antenna 20-1 and reads the return tag data 85 present on the reader antenna 20-1, typically in the form of an amplitude-modulated version of the original excitation signal 84 received at the tag. The excitation signal is typically at a frequency of about 125 KHz and the tag data is typically at 2 KHz. A single reader 48 is shared across an array of antenna 20-1 through an antenna distribution bus 27 (FIG. 3) electrically interfacing each connector port to a centralized location at the patch-panel.

As illustrated in FIG. 4, the composite fiber optic cable 42 with its resonant RF transmission line is comprised of two conductors 44 longitudinally coextensive with a length of the fiber optic cable 42. The two conductors may run down a central axis of the cable, or they wrap around the cable in a spiral fashion to prevent buckling and/or de-lamination of the conductors when the fiber optic cable 42 is bent. The conductor pair 44 serve as an RF transmission line, which is characterized by a capacitance per unit length, inductance per unit length, and a resistance per unit length. Depending on operating frequency of the RFID communication, different combinations of these electrical characteristics influence the system design. For example, at low frequencies, the resistance per unit length is a dominant factor in reducing the quality factor of the transmission line. Also, for relatively short cables 42, at 125 kHz the cable can be represented by a single lumped-element LC circuit. However, for long cables 42, the cable is more accurately represented as two separate lumped-element LC circuits coupled with one another through the extended transmission line. The coupling strength is relative to the resistance per unit length between the two LC oscillators.

The low frequency (125 kHz) RF transmission line 34 with conductors 44 and cable coils 20-2, 20-3 are integrated with a standard fiber optic cable 49 and LC fiber optic connectors 45. The cable coil is integrated near, on or within the body 37 of the connector 45. The leads of the cable coil 20-2, 20-3 are attached to the pair of transmission line conductors 44 that are permanently attached to the outside jacket 43 of the composite fiber optic cable 42. Potentially, the transmission line may also require discrete capacitors 22-2, 22-3 in the vicinity of the cable coil to provide an appropriate tuned resonance characteristic.

In the preferred embodiment, a relatively low frequency 100-150 kHz RFID carrier is transmitted by the intermediate fiber optic cable 42 with integral conductor pair, having, in addition, a pair of discrete, unshielded ferrite coils 20-2 and 20-3, with series or parallel capacitors 22-2, 22-3 respectively, to produce a resonance response with a quality factor of greater than 10, typically 30. The quality factor is limited by the series resistance 28 of the conductor pair 44. Under proper resonance conditions, the RFID excitation signal 83 is efficiently coupled to the tag 50 and the RFID data signal at the tag 50 is coupled back to the reader antenna 20-1.

In a further example, the RFID tag is a passive (that is, it derives power from an excitation signal induced across its coil) and responsive to a voltage excitation signal 84 in the range of 100 kHz to 150 kHz, typically centered at 125 kHz or 134 kHz. Such tags are referred to as low frequency (LF) tags, in contrast to high frequency (HF) tags at 13.56 MHz, and ultra high frequency (UHF) tags at 100 MHz to 10 GHz. To efficiently propagate the tag excitation signal and tag digital data signal across the intermediate resonant transmission line 42 as disclosed herein, there are particular advantages to utilizing this LF mode of operation, which minimizes electronic signal degradation due to the capacitance and/or inductance per unit length of the intermediate transmission line. Also, LF RFID systems exhibit a shorter reading range than HF or UHF tags because of the longer range of higher frequency electromagnetic fields. However, short range translates into increased spatial resolution, which provides particular advantages in the system aspects disclosed herein.

RFID tags operate in a read-only and/or read/write mode. Typical LF read-only tags include the EM4100 and EM4200 series from EM Microelectronic-Marin SA. These tags produce a 32 or 64-bit digital identifier using a Manchester or bi-phase coding scheme, for example. Similar LF passive tags are supplied by Texas Instruments, Atmel and Motorola Inc.

Figure 5:
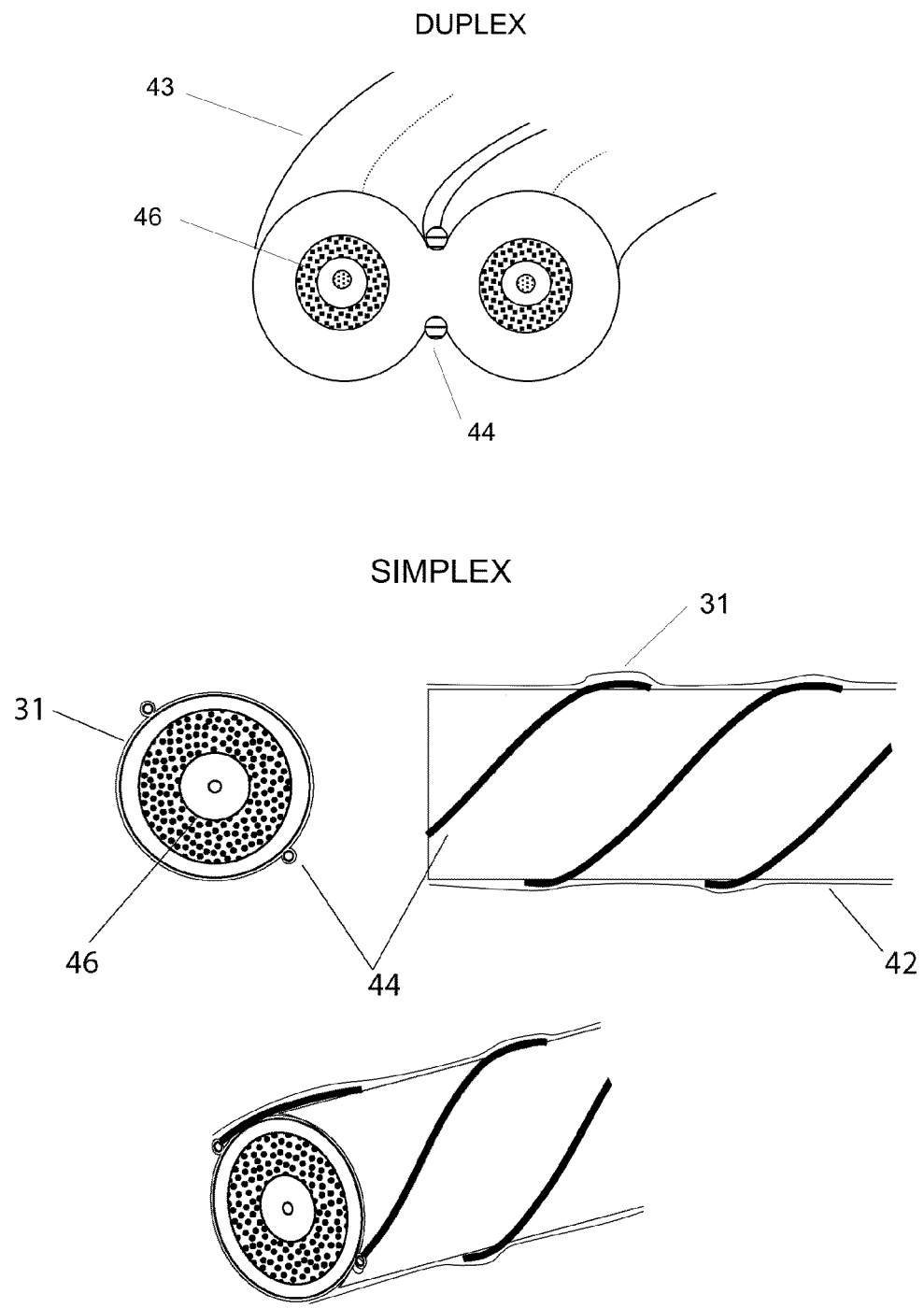
FIG. 5 illustrates a simplex electronically traceable cable with external conductors and a duplex electronically traceable cable with external conductors.

In a further example of the invention, the simplex composite fiber optic cable 42 includes a spiral wound pair of metallic conductors (FIG. 5). A pair of 30 to 40 AWG conductors are spirally attached to the outer cable jacket 43 and encapsulated or bonded using a thin, flexible, tough acrylate coating 31 that is applied to jacketed fiber optic cable by an in-line process. The coating is applied, for instance, by a spray or dip coating process, and can be cured inline by a thermal or UV cure process.

At the connector endpoints of the traceable fiber optic cable 42, the conductors 44 are separately attached to the two terminals of an inductor 20, such as a 1 mH ferrite core, unshielded type, integrated with a 1.6 nF capacitor (FIG. 4). These two components form a three-dimensional circuit stack that is housed within a plastic clip 49 that attached to the rear body of connector 45. While an LC simplex type connector is illustrated here, this approach applies to all connector types, such as the SC, ST, FC, MU and MT styles. Alternatively, for the case of a duplex cable 43, the conductor pair 44 may be attached to opposite sides of the section at which the twin cables join together. This is the typical cross-section for a duplex zipcord, for example, and has been disclosed in our previously filed U.S. patent application Ser. No. 12/114,117.

Figure 6:
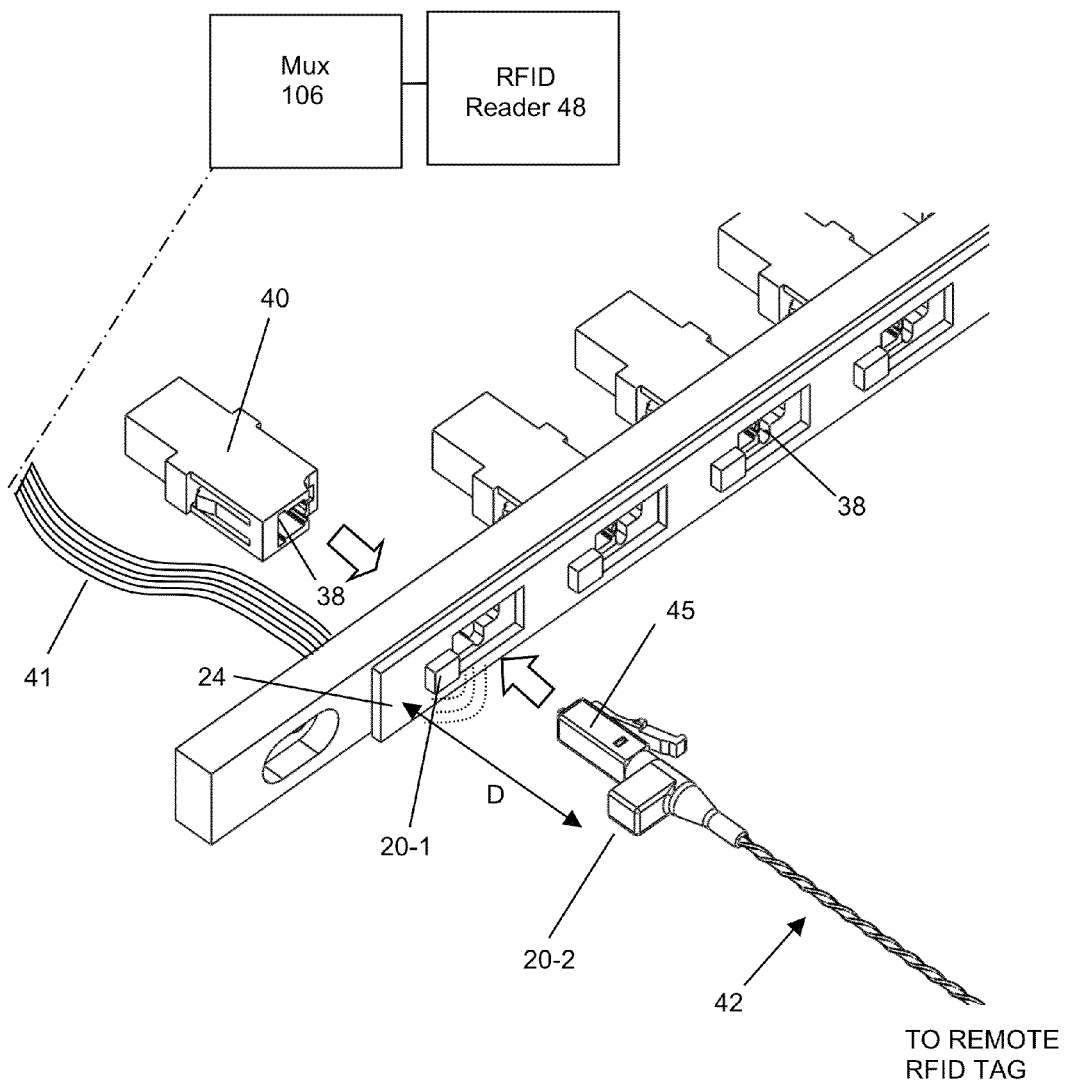
FIG. 6 illustrates a portion of a patch panel detailing the relationships between the fiber optic connector with integral resonant coil, traceable cable, and connector receptacles.

In a further example, FIG. 6 illustrates an exploded view of the RFID interface at a patch-panel network hub, comprising the LC adapter 40 with receptacle 38, a front panel printed circuit board (PCB) 24 with distributed surface mount antenna 20-1, and fiber optic connector 45 with integral antenna 20-2 and traceable composite cable 42.

An electrical cable 41 interfaces the PCB 24 to the electronic antenna selector (e.g., multiplexer 106) and RFID reader 48.

Figure 7:
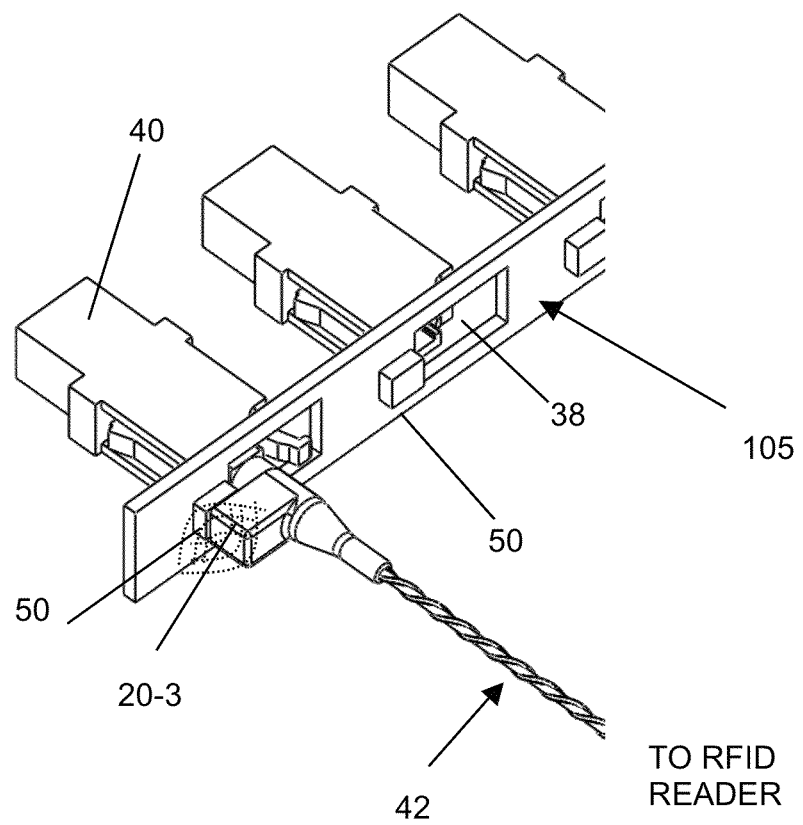
FIG. 7 illustrates a network element at the far side of the traceable cables with RFID tags attached to and adjacent connector receptacles.

For a large distance D between the connector 45 and RFID antenna 20-1 in FIG. 6, D being much larger the either the reader coil 20-1 or cable coils 20-2, 20-3, the reader 48 is unable to detect a tag data signal 85 from the remote RFID tag 50 at the other cable end (FIG. 7). Once the connector 45 is engaged within the receptacle 38 of adapter 40 (at a separation D of about 1 mm), the coupling is efficient enough (typically 50%-90% for 1 mH surface mount ferrite inductors) for the reader 48 to interrogate the distant tag 50 (FIG. 7).

Passive RFID tags 50 attached to each network element 105 port do not require electrical power to operate; they are excited through the RF reader excitation voltage 84 induced across the coil of the tag and rectified internal to the tag's transceiver circuit 22. The excitation voltage level for low frequency tags is typically 5 to 24 volts at 125 kHz. In accordance with this invention, low frequency tags have particular advantages to HF and UHF RFID tags, because it has been shown experimentally that LF tags 50 can be read out remotely through the intermediate RF transmission line 42 over significant distances without inducing signal reception degradation by providing suitable resonance characteristics.

Miniature tag coils 20 must fit on or around existing small form-factor fiber optic bulkhead adapters 40 used in standard telecommunications network equipment 105. Commercially available tag antenna, as well as reader antenna, are relatively large (5 cm long by about 2 cm wide) and optimized for maximum reading range. While antenna can be reduced in size by increasing the RF carrier frequency to 900 MHz or 2.45 GHz as for ultrahigh frequency (UHF) tags, these higher frequencies are not readily transmitted over the extended lengths of composite fiber optic cable 42 as are therefore not ideal for this application.

The measurement distance between a low frequency RFID reader and tag antenna are to first order comparable to the dimensions of the antenna 20. Since the density of connector receptacles 38 on typical network elements 105 such as core switches can be high, the RFID tags disclosed herein are reduced in size and discrimination range by about a factor of 10. To miniaturize the antennas, a cylindrical antenna coil on a ferrite core is utilized and soldered into a multilayered, stacked, three-dimensional circuit assembly including a surface mount capacitor and inductor.

An additional requirement of the RF transmissive fiber optic cable is that the non-zero resistance $R_2$ associated with the fine wire RF transmission line within the composite fiber optic cable 42 does not reduce the cable Q below 10-30. To achieve acceptable coupling strength between the reader and tag circuits, they operate in resonance with a relatively large quality factor. Series resistance 28 resulting from the intermediate transmission line will effectively.

Figure 8A:
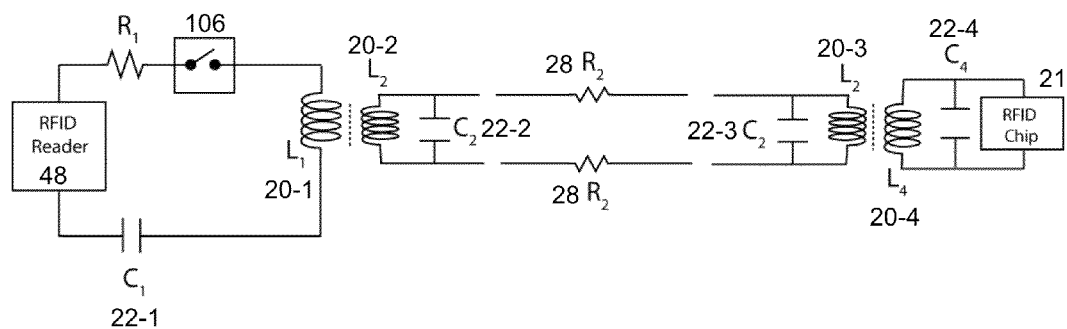
FIG. 8A illustrates a simplified, lumped element representations of an RFID link utilizing parallel resonance
Figure 8B:
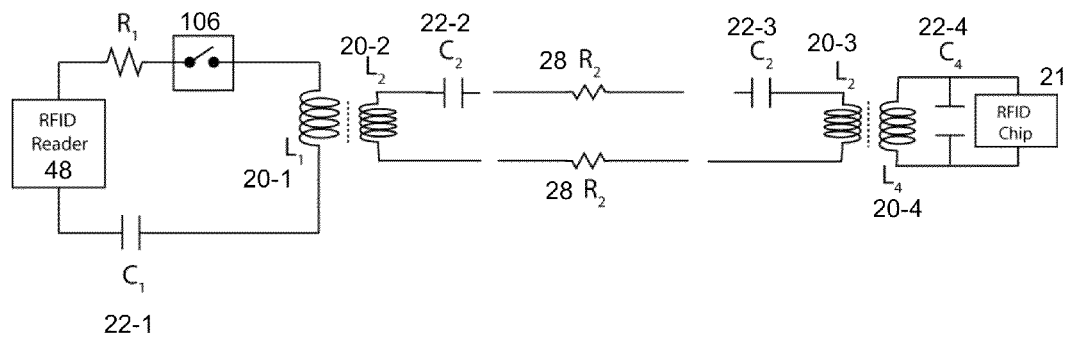
FIG. 8B illustrates a simplified, lumped element representations of an RFID link utilizing parallel resonance series resonance.

The inductive mode of RF coupling, dominant for low frequency systems, is dependent on multiple parameters, notably the transmission line's length and characteristic impedance, the size and number of turns of the reader, cable and tag coils, and the relative spatial orientations of the reader, cable, and tag coils. Parameters such as coupling strength and discrimination range depend on antenna designs. The coil design, wire gauge, transmission line geometry and length on readout performance are all design factors. The design of the link in terms of a simplified, equivalent circuit model for both a parallel and series resonant transmission line is illustrated in FIGS. 8-A and 8-B.

Figure 9A:
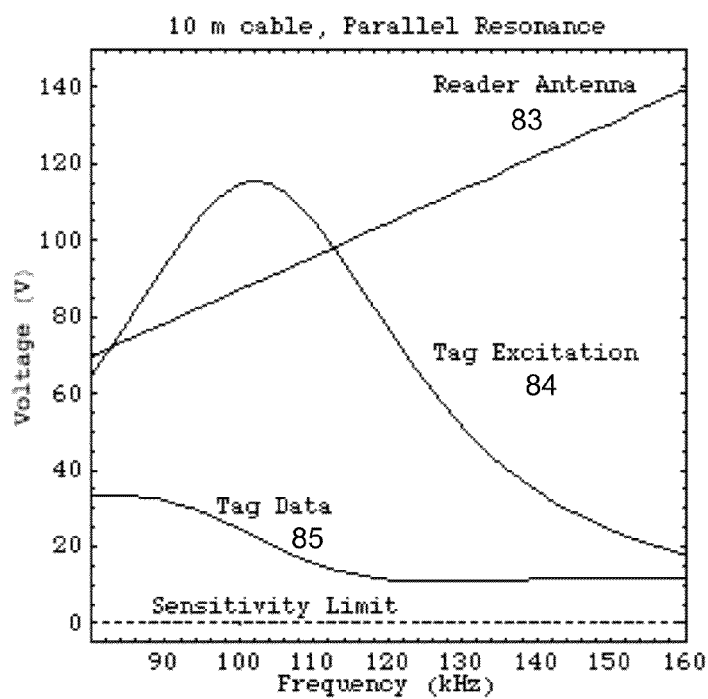
FIG. 9A illustrates the calculated response of an RFID link in the parallel configuration across a 10 m transmission line and FIG. 9B illustrates the calculated response of an RFID link in the parallel configuration across al km transmission line.
Figure 9B:
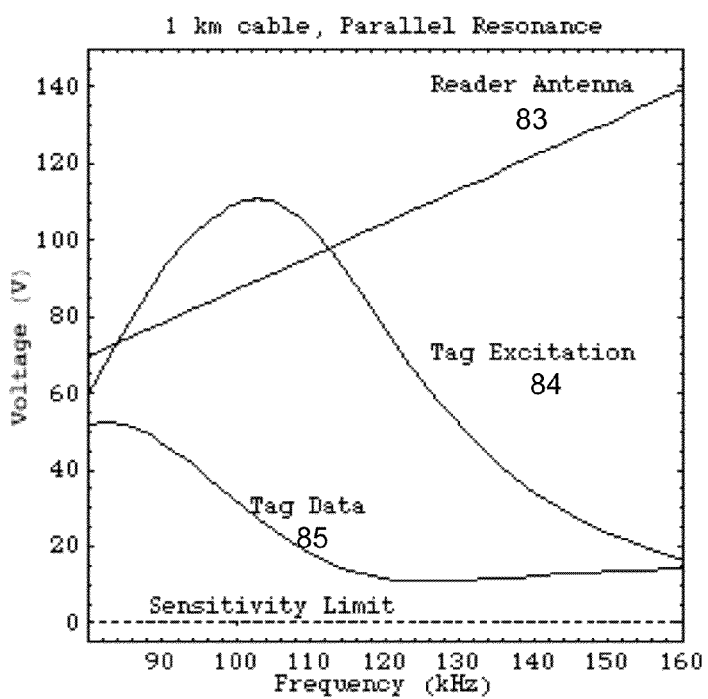
Figure 10A:
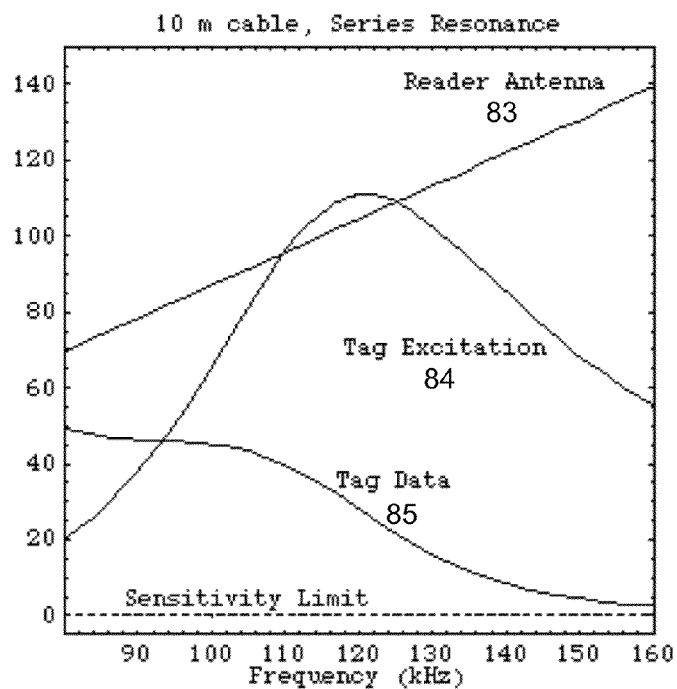
FIG. 10A illustrates the calculated response of an RFID link in the series configuration across a 10 m transmission line and FIG. 10B illustrates the calculated response of an RFID link in the series configuration across a 1 km transmission line.
Figure 10B:
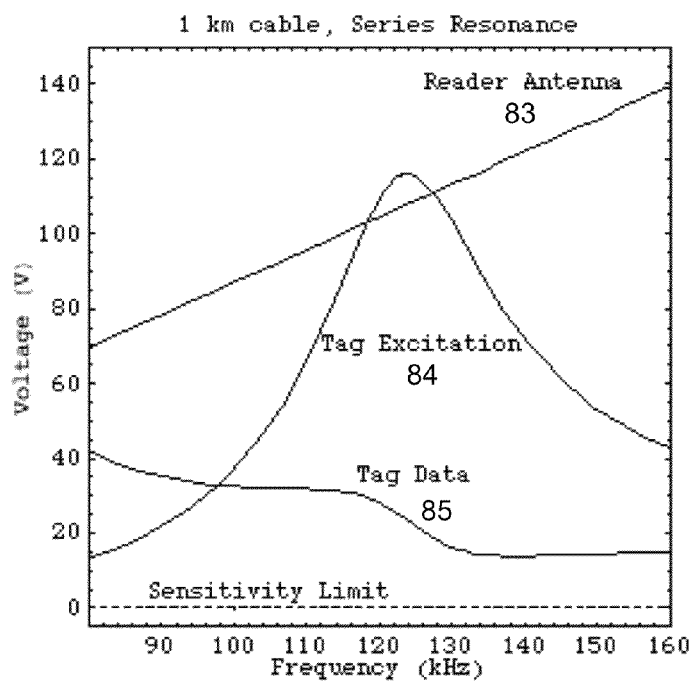

The corresponding signal levels at various points in these circuits are shown in the example calculation of FIGS. 9 and 10, for parallel and series circuits respectively, and for (A) a 10 meter resonant transmission line and (B) a 1 km resonant transmission line. This analysis illustrates that the resonant transmission line integral to an optical fiber, as disclosed herein, can extend the reading range to in excess of km. In an example calculation, the reader antenna signal 83 corresponds to the induced voltage on the reader antenna 20-1. This voltage is resonantly enhanced by the capacitor in series with the reader coil. This voltage propagates down the resonant transmission line to induce a tag excitation voltage 84 across the tag coil 20-4. This excitation voltage must exceed a threshold value sufficient to power the tag. Given a sufficiently large voltage (>a few volts), the tag will return a modulated data signal 85 with the tag identifier across the reader capacitor for demodulation by the reader 48. This return signal should exceed the sensitivity limit of the reader.

These calculations correspond to the selection of L and C circuit elements to produce a resonance at 125 kHz for each individual LC oscillator, either in the parallel or series configuration, in isolation of other oscillators. However, the mutual inductance between the pairs of coils can potentially pull the resonance frequencies to a different value because of the potentially strong inductive coupling between the reader and cable, cable and tag. Therefore, it is optimal to account for this strong perturbation during the design process and select values of L and C that provide a resonance at 125 kHz, or any other design frequency, while accounting for the typical mutual inductance exhibited by the system.

NETWORK MANAGEMENT SYSTEM

In accordance with the invention, the RFID overlay system described herein has multiple interrelated elements: (1) efficient, resonant inductive coupling between the reader, resonant fiber optic cable and RFID tag, (2) intermediate, flexible RF transmission line elements integrated with fiber optic patch-cords, (3) miniature antenna and tag coils to discriminate between closely spaced ports, and (4) an RFID reader that is time multiplexed across a multiplicity of cables to increase the reading range and enable automation.

Figure 11:
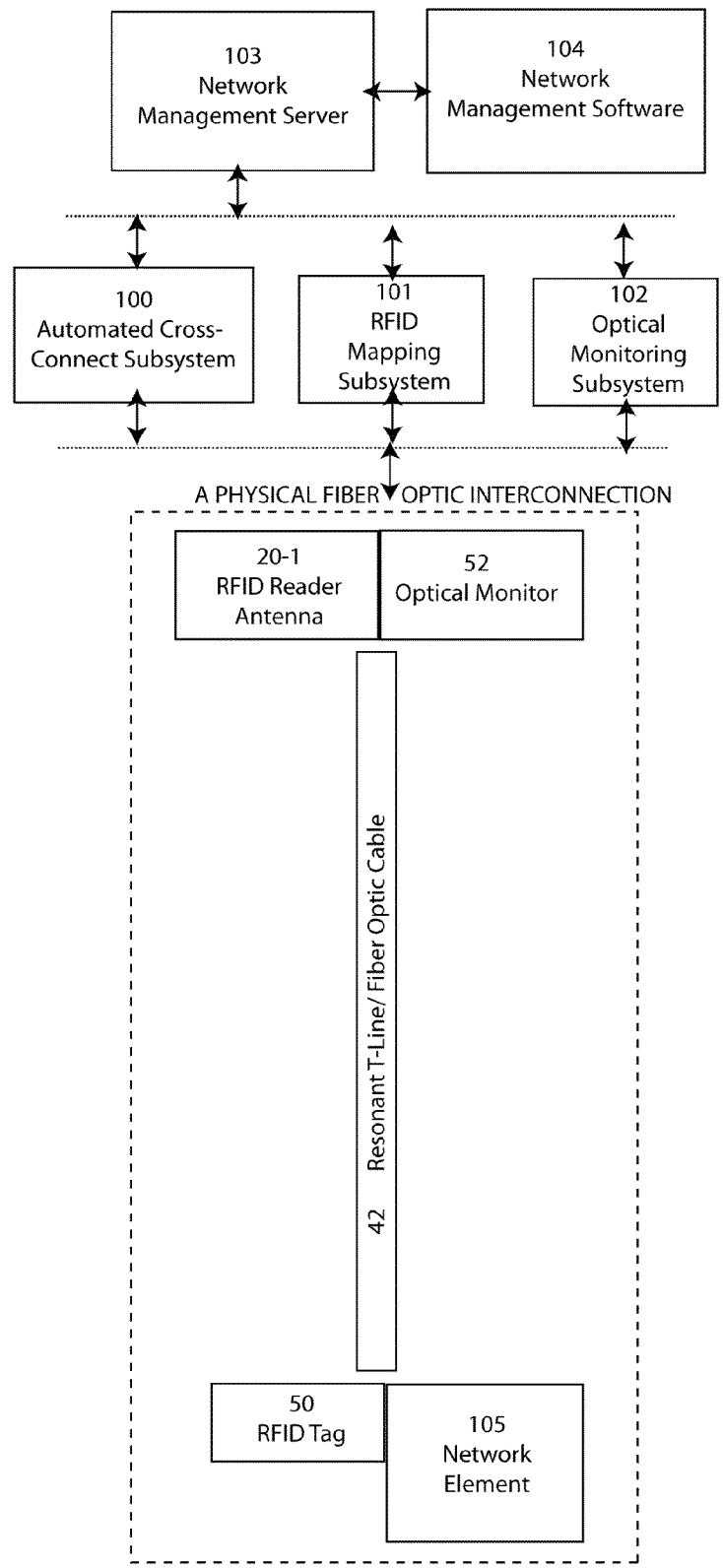
FIG. 11 is a block diagram illustrating the automated physical layer of a communication network including the RFID subsystem.

In a particular system embodiment illustrated in block diagram form in FIG. 11, an automated physical layer network management system is controlled from a network management server 103 on which network management software 104 resides. The server is in communication with one or more local or geographically distributed RFID mapping subsystems 101. Each mapping subsystem 101 is comprised of a multiplexed RFID reader 48 that sequentially reads the identifiers associated with each composite cable 42 and communicates the connection status of each cable back to the network management system (NMS) through a controller and communication interface, for example, using an Ethernet protocol. Each physical link is thereby represented by a unique software agent. This agent updates the various physical layer databases with information such as physical port mapping, number of times a connector receptacle has been mated, number of cleaning cycles per connector, type of connector (LC, SC, FC, etc.), type of fiber (SM, MM), or any other relevant parameter. These databases may reside in one or more distributed network management servers 103.

Any change in physical connectivity as reflected by a change in the data transmitted by an RFID tag 50 from a particular cable 42 read through a particular reader antenna 20-1. Such changes are automatically reported to the network management software 104 and the corresponding network interconnection records are updated. Ultimately, the inventory and configuration records for thousands to millions of passive physical connections 42 within the network are fully automated and accurately recorded to provide real-time physical layer mapping.

By inputting the desired logical network topology and automatically referencing the attributes of each network element 105 port receptacle 38 through an RFID overlay network, the corresponding physical connections to implement this topology can be tested, validated and established automatically by the physical layer management system. The network management software 104 periodically polls each RFID mapping subsystem 101 to perform a sweep of all connector receptacles 38 on the patch-panel 100, to determine which receptacles on the patch-panel are attached to network elements 105 and which ports are disconnected. In a particular example, this patch-panel is an automated cross-connect 100 which can also be controlled and reconfigured by the network management software 104. Only those interconnections 42 physically attached to network elements 105 will respond back with an RFID identifier.

In a further example, this automated interconnect system represents each passive fiber optic cable 42, or more accurately, each interconnection, by a Simple Network Management Protocol or SNMP agent. The electronic RFID overlay network that operates in parallel with the underlying optical network. Each 32-bit or 64-bit RFID tag identifier, for example, is an alias for a network element 105 port. The alias points to attributes such as wavelength, location, level of security, network element, etc. through a database/lookup table. Therefore, by monitoring tag aliases, true physical-network-layer maps can be generated.

Once the configuration information is entered, automated software applications significantly increase the accuracy and simplicity when executing a Move, Add and Change (MAC) by reducing future manual record updating. For instance, if a fiber optic cable 42 is disconnected from a first port and moved to a second port, the new RFID tag 50 identifier will be read and the interconnect database automatically updated. If a port that has been defined as "secure" is reconfigured, an alarm and/or report will be automatically generated to alert the administrator of a potential security breach.

Moreover, to assist a user in the installation of a patch-cord, the software application can search the database of physical connections for the correct RF identifier or alias for the desired port or receptacle. The system can then direct the technician to the precise location of this port, a process that can be assisted further by a standard, handheld RFID reader.

In a further example, by integrating the RFID tag 50 adjacent the cleaning surface of a standard fiber optic cleaning cartridge (e.g., NTT Optipop™ or Cletop™), the network management system can record the number of passes of a fiber connector end-face 65 across the cleaning fabric. This monitoring ensures proper maintenance procedures are followed. Alternatively, an RFID tag 50 can be integrated with a hand held, networked optical power meter. The RFID tag is integral with fiber optic connector receptacle on the instrument. When a particular cable in inserted into the power meter, it reads the RFID of the power meter, and by correlating the RFID back through the RFID reader in the patch-panel or cross-connect, the location of the power reading can be precisely located on the physical network layer map. This power reading is automatically stored as an attribute of this particular connection, so that future troubleshooting is facilitated.

In a further example, to prevent the disconnection of a cable transmitting live traffic, an on-site technician can first identify and verify that the cable 42 is correctly identified, by inserting a metallic card between the cable antenna and RFID tag, thereby temporarily interrupting the RFID link. The network management software 104 uses this information to report back the status of this connection to the technician prior to its disconnection.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A radio frequency identification (RFID) overlay device for monitoring a status of an individual selectable optical fiber connection on a distributed fiber optic communication network which transmits data along a plurality of fiber optic cables extending between a multiplexer at a cross-connect terminal and a plurality of spaced apart elements in the network, the RFID overlay device comprising:
    a cross-connect terminal comprising a plurality of bi-directionally operable inductance arms extending from the cross-connect terminal and each launching RFID tag signals at a frequency of less than about 200 kHz;
    a plurality of coupling circuits, each coupling circuit comprising a pair of conductors extending along a corresponding fiber optic cable between a corresponding inductance arm of the cross-connect terminal and a corresponding network element, each coupling circuit further including terminal inductances interactive with the cross-connect terminal at one end and with the corresponding network element at the other, and each coupling circuit further comprising resistance and capacitance elements distributed along its length and providing a resonant response with a quality factor greater than 4;
    a plurality of network element circuits each including an inductance operatively coupled to the terminal inductance of the corresponding coupling circuit at an end of the corresponding network element, each circuit further having a different transceiver response to the received RFID signals, having dimensions less than about 5 mm, and passively generating an RFID tag response comprising a preselected code of multi-binary digit length to uniquely identify the corresponding network element, each RFID tag response being returned through the corresponding coupling circuit to the corresponding inductance arm of the cross-connect terminal; and
    an antenna distribution bus feeding the RFID tag responses returned from the network elements to an RFID reader at the cross-connect terminal for passively detecting the presence of an individual RFID tag response in the RFID tag responses returned from the transceiver.

2. A device as set forth in claim 1 above, wherein the RFID tag signals comprise binary voltage excitations in the range of 100 kHz to 150 kHz in frequency and spacings between the inductances of each network element and the corresponding coupling circuit are less than 50 mm.

3. A device as set forth in claim 2 above, wherein the pair of conductors in each coupling circuit are wound helically about the corresponding fiber optic cable between the cross-connect terminal and the corresponding spaced apart network element, and wherein the corresponding RFID tag response is of at least 32 binary digits in length.

4. A device as set forth in claim 1 above, wherein the circuit coupling terminal inductances are in close proximity to each other and of a miniature size comparable with a transceiver comprising a three dimensional stack of substantially flat two-terminal circuit elements electrically coupled in parallel within a volume of less than 200 $mm^3$.

5. A device as set forth in claim 4 above, wherein the elements in the stack of two dimensional circuit elements comprise a planar surface mount ferrite inductor, a planar RFID transceiver, and a planar surface mount external resonant capacitor vertically disposed in series and further including at least two conductive joiner circuits at peripheries thereof.

* * * * *